(12) United States Patent
Holstein et al.

(10) Patent No.: US 8,368,242 B2
(45) Date of Patent: Feb. 5, 2013

(54) IMMERSIBLE ENERGY GENERATION INSTALLATION

(75) Inventors: Benjamin Holstein, Heidenheim (DE); Norman Perner, Neu-Ulm (DE)

(73) Assignee: Voith Hydro Holding GmbH & Co. KG, Heidenheim (DE)

( * ) Notice: Subject to any disclaimer, the term of this patent is extended or adjusted under 35 U.S.C. 154(b) by 572 days.

(21) Appl. No.: 12/450,618

(22) PCT Filed: Apr. 1, 2008

(86) PCT No.: PCT/EP2008/002577
§ 371 (c)(1),
(2), (4) Date: Feb. 25, 2010

(87) PCT Pub. No.: WO2008/119546
PCT Pub. Date: Oct. 9, 2008

(65) Prior Publication Data
US 2010/0201129 A1    Aug. 12, 2010

(30) Foreign Application Priority Data
Apr. 3, 2007 (DE) .......................... 10 2007 016 380

(51) Int. Cl.
*H02K 1/22* (2006.01)
(52) U.S. Cl. ........................................... 290/54; 290/52
(58) Field of Classification Search .................. None
See application file for complete search history.

(56) References Cited

U.S. PATENT DOCUMENTS

| 4,376,753 | A | * | 3/1983 | Lucas ........................... 376/305 |
| 4,445,046 | A |   | 4/1984 | Allegre et al. ................. 290/52 |
| 4,740,711 | A | * | 4/1988 | Sato et al. ..................... 290/52 |
| 6,898,935 | B2 | * | 5/2005 | Barber et al. .................. 60/646 |
| 7,385,303 | B2 | * | 6/2008 | Roos .............................. 290/54 |
| 7,919,877 | B2 | * | 4/2011 | Shimizu et al. ................ 290/43 |
| 2011/0070123 | A1 | * | 3/2011 | Stodola .......................... 422/12 |

FOREIGN PATENT DOCUMENTS

| CH | 222 625 | 7/1942 |
| GB | 2 050 525 | 1/1981 |
| RO | 118 896 | 12/2003 |
| SU | 339 973 | 10/1973 |

OTHER PUBLICATIONS

International Search Report and Written Opinion dated Jan. 9, 2009 from PCT Application No. PCT/EP2008/002577.
International Preliminary Examination dated Jul. 8, 2009 from PCT Application No. PCT/EP2008/002577.

* cited by examiner

*Primary Examiner* — Michael Zarroli
(74) *Attorney, Agent, or Firm* — Ohlandt, Greeley, Ruggiero & Perle, L.L.P.

(57) ABSTRACT

A submersible power generation plant includes a water turbine standing freely on a support structure in an ambient flow; an electric generator which is driven at least indirectly by the water turbine; at least one generator component of the electric generator is enclosed by at least one corrosion protection element which seals against ambient water, with cavities within the corrosion protection element each being filled with a heat-conductive medium; at least one pass-through duct being provided for dissipating waste heat from the electric generator, which the pass-through duct conducts the ambient water and leads through the corrosion protection element without entering into any material exchange with a region encapsulated by the corrosion protection element, and a growth protection system arranged on a flow input of the pass-through duct on an upstream side.

13 Claims, 7 Drawing Sheets

IMMERSIBLE ENERGY GENERATION INSTALLATION

The invention relates to a submersible power generation plant, especially for electrical power generation from an ocean current, preferably a tidal current, with the submersible power generation plant being arranged to be free-standing.

Free-standing, submersible power generation plants are placed without any additional hydraulic engineering measures such as dam structures into a water current. This can be flowing waters or an ocean current, especially a tidal current. Such free-standing power generation plants which are arranged to be submersible typically comprise at least one water turbine which drives an electric generator at least indirectly. Preferably, the water turbine is attached to a gondola which houses the electric machine. The gondola is fixed to a support structure, with said support structure having its foundation on the ground of the water body or being arranged as a floating unit which is held in position by an anchoring or towing cable system.

Maintenance and service work proves to be difficult for power generation plants of this kind because accessibility to the power generation plant is limited especially in the case of power generation from an ocean current. In most cases it will be necessary to lift the unit consisting of electric machine and turbine beyond the water level in order to perform maintenance. For this reason, an embodiment of a respective power generation plant is desirable which allows long maintenance intervals and is especially preferably arranged to be free from maintenance over the entire life of the machine.

The invention is based on the object to arrange the cooling of the generator components of the electric generator of a free-standing submersible power generation plant in such a way that the sturdiest possible system is obtained which offers the longest possible service intervals for permanent operation in corrosive ambient water, especially in salty ambient water laced with sediments. The entire system should be simple in respect of construction and production and enable the construction of a compact gondola for receiving the electric machine.

In order to solve the object as mentioned above, the inventors have recognized that the components of the electric machine, which are designated below as the generator components, need to be separated from the ambient water by means of a corrosion protection element and the thermal coupling needs to be improved between the corrosion protection element and the heat-generating generator components by accommodating a heat-conductive medium filling the cavities in the corrosion protection element. Accordingly, the corrosion protection element is not only used for encapsulating the generator components against corrosion, but it also acts in addition as a heat exchanger surface to which the heat obtained in the generator components is guided and which is in direct thermal contact with the ambient water at least in partial areas. Cooling preferably occurs in a purely passive manner.

The generator components to be protected are the stator with the stator cores and the armature windings on the one hand, and the rotor with its magnetic components on the other hand. In the case of an independently excited machine, the rotor cores and the field windings must be encapsulated on the rotor side by a corrosion protection element which is thermally coupled by a heat-conductive medium. In addition, the electric generator components and the power-electronic components for network coupling can be encapsulated and cooled by the measure in accordance with the invention of a combined corrosion protection in combination with a heat-conductive structure.

According to a first variant of the invention, the corrosion protection element is arranged as a closed housing and produces an encapsulated stator region or accordingly an encapsulated rotor region for example. These encapsulated regions are used to accommodate at least a part of the generator components, with a free volume being present between the generator components and the corrosion protection element for this first variant, which free volume is filled in accordance with the invention with a heat-conductive medium. Such an encapsulation securely prevents the penetration of the ambient water into a fixed volume region and thus a corrosive load on the respectively encapsulated components. It is necessary according to an advantageous embodiment to provide a can between stator and rotor which forms a portion of the wall region of the corrosion protection element and through which the magnetic field of the electric generator will penetrate in a substantially unobstructed way. Preferably, this can is formed by an austenitic sheet steel. Within the region encapsulated by the corrosion protection element, all cavities are filled by means of a heat-conductive medium for the best possible thermal coupling between the encapsulated generator element and the corrosion protection element. This can be a fluid or viscous substance such as an oil or a synthetic ester compound for electrotechnical purposes. Solid materials in granular form for example for the heat-conductive medium are also possible. Moreover, the heat-conductive medium can also be caused by filling the cavities in the corrosion protection element, e.g. by means of an epoxy resin for example. When filling is made completely, it is possible to protect the outside surface of the cast body by a jacket or coating which is a part of the corrosion protection element, so that in the gap region there is no can in the actual sense, but merely a cast region whose edges form the boundary surface to the gap.

According to a second embodiment of the invention, the housing region in which the generator component to be protected such as the stator is positioned and flowed through by the ambient water, so that the corrosion protection element substantially follows the shape of the generator component to be protected. For example, the stator cores and the armature windings can be coated or cast or packed into an encasing that protects against corrosion by the ambient water or can be protected by a protective anti-corrosive coating. In accordance with the invention, cavities between the corrosion protection element and the generator component are preferably filled with an epoxy resin for improved thermal coupling by means of heat-conductive medium. The surface of the corrosion protection element forms the thermal contact surface to the ambient current guided through the housing of the power generation plant.

Furthermore, additional elements can be provided for advantageous embodiments of the invention which are in thermal connection with the heat-conductive medium and are capable of enabling a heat flow from the heat-conductive medium through the corrosion protection element to the ambient current. These are heat-exchanger structures in the simplest of cases. Alternatively, one or several heat pipes can be used. Heat pipes have a closed structure which protrudes into the body to be cooled and which is partly filled with a heat-conductive medium. On the other side, this structure is enclosed by a heat sink. Efficient heat dissipation occurs by evaporation of the heat-transfer medium on the side of the heat source, the supply of the steam thus generated to the cold side of the heat pipe by means of convection and the subsequent condensation. The heat pipe can be arranged in such a way that the heat-transfer medium is guided back to the hot side by gravity or by capillary forces. Preferably, a plurality of heat pipes is used which reach into the heat-conductive medium between the generator components generating the waste heat or directly into the generator components, e.g. the armature windings of the stator.

It is also possible according to an advantageous embodiment of the invention to provide a system of pass-through ducts for the ambient water which lead through the corrosion protection element and which are used for dissipating the waste heat of the generator components, without entering into an exchange of material with the region encapsulated by the corrosion protection element. Accordingly, the walls of the pass-through ducts are parts of the enclosing corrosion protection element.

Growth protection systems are further provided for an advantageous embodiment on one or several regions of the outside of the corrosion protection element, especially in fissured regions or such with reduced flow. They act against progressive growth by application of ultrasonic pulses, UV radiation or short-time heating and thus permanently keep the flow ducts and cooling fins which are part of the corrosion protection element free from growths.

The invention is now explained in closer detail by reference to advantageous embodiments in connection with the drawings which show as follows in detail:

Figure 1:
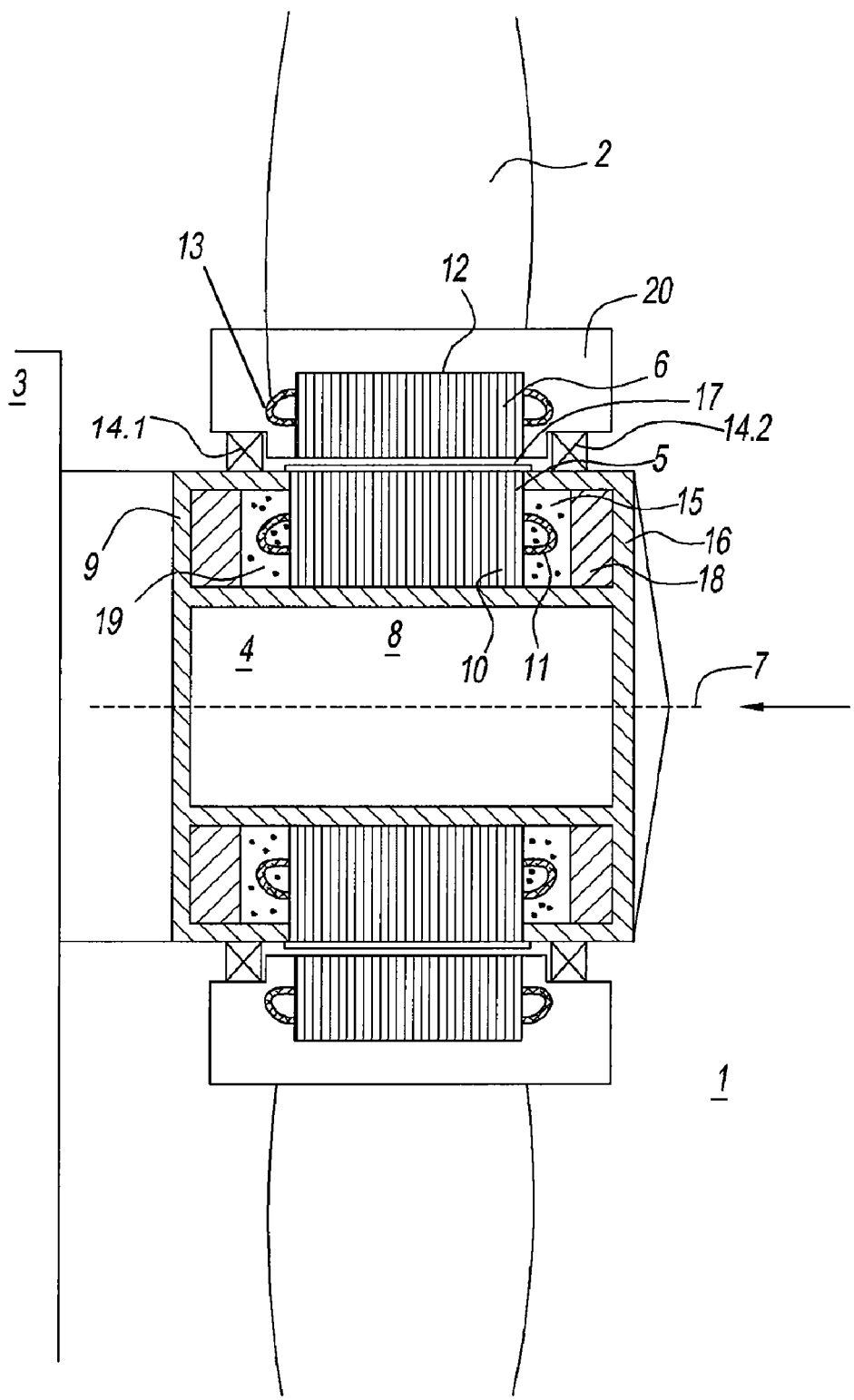
FIG. 1 shows an axial sectional view through a power generation plant in accordance with the invention.

The axial section shown in FIG. 1 through a submersible power generation plant 1 in accordance with the invention which is shown in a schematically simplified way outlets parts of a water turbine 2 which is arranged as a propeller-like turbine with at least two rotor blades. Further embodiments of the water turbine 2 are possible, e.g. the use of a vertical turbine. The water turbine 2 is fastened to a gondola 4 which is fixed at least indirectly to a support structure 3. The submersible power generation plant 1 in accordance with the invention stands freely in an ambient current, typically an ocean current and especially preferably a tidal current. Free-standing shall mean such an arrangement of the submersible power generation plant in which the water turbine 2 is not integrated in a dam structure.

For the advantageous embodiment as shown in FIG. 1, water turbine 2 is connected with an electric generator 8 in order to drive the same directly. Especially preferably, a rotor 6 of the electric generator 8 which is arranged as an external rotor is arranged together with the water turbine 2 as a component revolving on the housing 16 of gondola 4. Accordingly, the bearings 14.1 and 14.2 are outlined for this purpose. However, the internal rotor arrangements and an indirect drive of the electric generator 8 by the water turbine 2 are also possible.

A corrosion protection element 9 is provided for the protection of the generator components, especially the stator 5 with the stator cores 10 and the armature windings 11 as well as the rotor 6 and the magnetic elements provided in the same, e.g. the rotor cores 12 and the field windings 13 in the case of an independently excited synchronous generator, which corrosion protection element encloses the generator components for screening against the corrosive effect of the ambient water. Accordingly, further generator components such as the power electronics for network connection can be enclosed in the corrosion protection element 9, or a separate corrosion protection element 9 is allocated to the same.

An embodiment of a corrosion protection element 9 is explained below which encloses an encapsulated stator region 19. The following statements can be applied accordingly to an encapsulated rotor region 20 or to further encapsulated regions for accommodating the power electronics, which further regions are not illustrated in detail in the drawing. The encapsulated stator region 19 is used for receiving the stator cores 10 and the armature windings 11. It is enclosed by the corrosion protection element 9 which is formed in the present case by parts of the load-bearing housing 16 of the gondola 4. This enclosing corrosion protection element 9 is sealed in the region of the gap between stator 5 and rotor 6 by a can 17 which consists of a non-magnetizable material through which the generator field can pass in a substantially unobstructed way. A possible embodiment can be sheet metal made from austenitic steel. The corrosion protection element 9 is completed by the housing 16 and the can 17 and encloses the encapsulated stator region 19.

In addition to protection from corrosion, parts of the corrosion protection element 9 are used as a cooling element for the dissipated heat obtained during the operation of the electric generator 8. As a result, at least partial sections of the corrosion protection element 9 are in direct thermal contact with the ambient water for cooling purposes. In accordance with the embodiment shown in FIG. 1, these are substantially the partial regions of the external housing 16 which enclose the encapsulated stator region 19. As an additional measure in accordance with the invention, the thermal coupling between the heated generator components and the corrosion protection elements 9 which enclose the same is improved by filling the cavities within the corrosion protection element 9 by means of a heat-conductive medium.

The heat-conductive medium 15 can be a liquid medium such as an oil or a synthetic organic ester compound for electrotechnical purposes. A non-water-hazardous ester compound with good biodegradability which fulfils the norm IEC61699 is preferably used. It should further offer a high specific heat and a high flash point. Furthermore, a low vapor pressure under the chosen operating conditions is advantageous. A halogen-free pentaerythritol ester can be used for example as a suitable ester compound, which ester is offered under the brand name Midel®7131 of M&I Materials Ltd. Alternatively, a solid body is used as a heat-conductive medium, e.g. a thermally well-conductive bulk material which is present in the form of a granulate. Further embodiments of the heat-conductive medium 15 include casting compounds such as epoxy resins. Once an encapsulated interior region such as an encapsulated stator region 19 or an encapsulated rotor region 20 is formed by the corrosion protection element 9, a certain thermal expansion of the heat-conductive medium 15 can be permitted during heating in accordance with a further development of the invention when at least parts of the corrosion protection element 9 are arranged to be elastic or when pressure equalizing vessels are in connection with the encapsulated regions.

Figure 2:
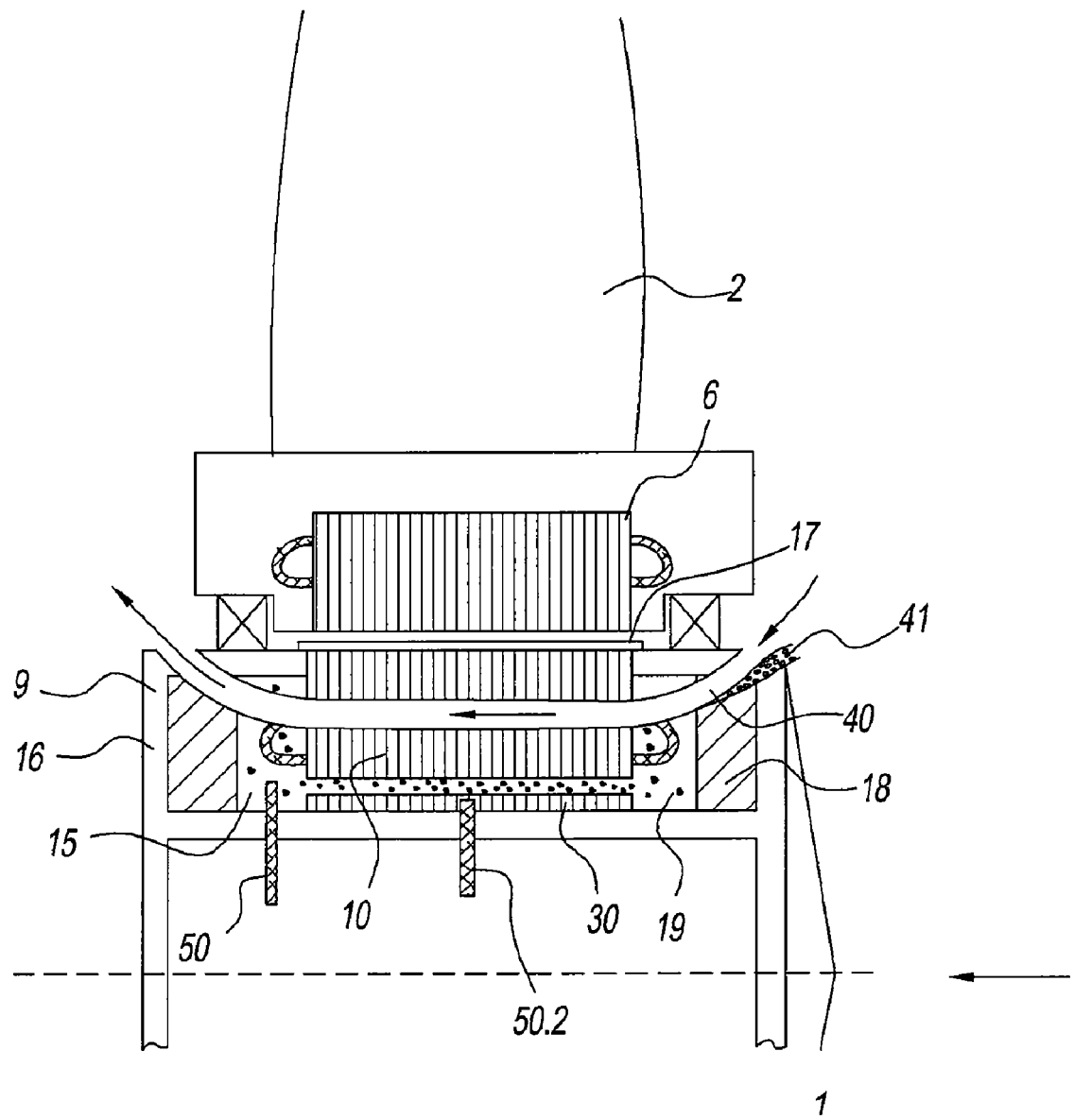
FIG. 2 shows a sectional view of FIG. 1 with a further development of an embodiment of the invention.

FIG. 2 shows possible embodiments of the invention which improve the heat dissipation from the generator elements. The embodiment shown in FIG. 2 uses an encapsulated stator region 19 which is enclosed on all sides by a sealing corrosion protection element 9 which is formed by parts of the housing 16 and a can 17. A heat-conductive medium 15 is again provided in the cavities within the corrosion protection element 9. It is able to efficiently dissipate heat from the interior of the stator core 10 through pass-through openings in the stator core 30. Furthermore, the direct heat transfer from the stator core 10 to the corrosion protection element 9 is improved by the connection of the stator core 10 with the housing 16 and/or the can 7 in the form of a press fit. Moreover, the thermal coupling between the heat-conductive medium 15 and the corrosion protection element 9 is increased in such a way that cooling fins 18 are provided which protrude into the encapsulated stator region 19 and which are arranged to be integral with the housing 16.

Furthermore, FIG. 2 shows a further development of the invention in which ambient water is guided through the encapsulated stator region 19 by means of a closed piping system. A pass-through duct 40 is shown for this purpose in FIG. 2, on which an inflow opening for the ambient water is present on the upstream side of the gondola, which is drawn off again on the lee side. In this case, a passive through-flow is provided. In addition, a forced flow by using a pump in the pass-through duct 40 can be realized. For the embodiment as described above, the wall region of the pass-through duct 40 is part of the corrosion protection element 9 and is accordingly made from a respective material. This means that for the embodiment as shown in FIG. 2 the ambient water does not enter the encapsulated stator region 19. Instead, there is merely a thermal contact with the generator components that are pierced by the pass-through duct 40, especially the stator core 10, and the heat-conductive medium 15 which is located within the encapsulated stator region 19.

One or several heat pipes 50, 50.2 can further be provided for heat dissipation from the encapsulated stator region 19, which pipes cause an energy flow from the hot side of the encapsulated stator region 19 to a cool side, e.g. the interior of the gondola 4. A heat pipe (not shown) can be guided alternatively through the corrosion protection element 9 to the outside region with the ambient flow. It is further preferable to use a plurality of heat pipes 50, 50.2 which reach into the heat-conductive medium 15 or the generator components to be cooled (see the heat pipe in FIG. 2 which is provided with the reference numeral 50.2 and is in thermal contact with the stator cores). Recesses such as bore holes can be provided in the stator core for accommodating the heat pipes. Furthermore, active heat exchanger elements can come into thermal contact with the heat-conductive medium 15 in the interior of the encapsulated stator region 19 either alternatively or in addition, and can guide heat to a heat exchanger which is in thermal contact with the outside flow. This heat exchanger, which is not shown in detail in the drawings, may comprise a cooling fin structure on the outside of the corrosion protection element 9 which comes into contact with the ambient water.

The problem of possible growth occurs for all structures of the submersible power generation plant 1 which come into contact with the ambient water. This represents a problem especially for the rugged structures. Examples are the inlet openings for the variant for example in which a pass-through duct 40 through an encapsulated region is present, or cooling fins on the outside of the corrosion protection element 9. Accordingly, a growth protection system 41 is provided for an advantageous embodiment of the invention, especially in such critical regions. FIG. 2 shows such a growth protection system 41 on the upstream flow input of the pass-through duct 40. Possible embodiments of a growth protection system comprise ultrasonic elements or UV devices which are used for regular destruction of settling growth. According to one embodiment, the growth protection system 41 comprises a heating device which raises the temperature of the growth protection system 41 and the ambient environment in which it is arranged for a short time to such a level that growth is destroyed.

During the heating of a growth protection system, a disadvantageous effect on the cooling effect can be compensated in such a way that the heating occurs over a short period of time and in a cycled manner and the heating-free intervals are extended to relatively long periods. According to an alternative embodiment, the growth protection system can be arranged in such a way that only partial regions are heated at a certain time which are then freed from growth, whereas other parts will only be heat-treated at later times, so that the cooling performance of the entire structure is reduced only marginally. It is possible in this respect to provide several pass-through ducts 40 which each comprise separate access points where growth protection systems are present which are each allocated to these access points only. At a certain time, only one of the growth protection systems is thermally activated, so that ambient water which is used for the cooling and flows into the other pass-through ducts is not influenced by the heating measures at one single pass-through duct. There is further the possibility for systems for which there are specific standstill periods such as tidal power plants that the operation of the growth protection system is limited to the duration of the standstill of the generator or generally to times of low power generation.

Figure 5:
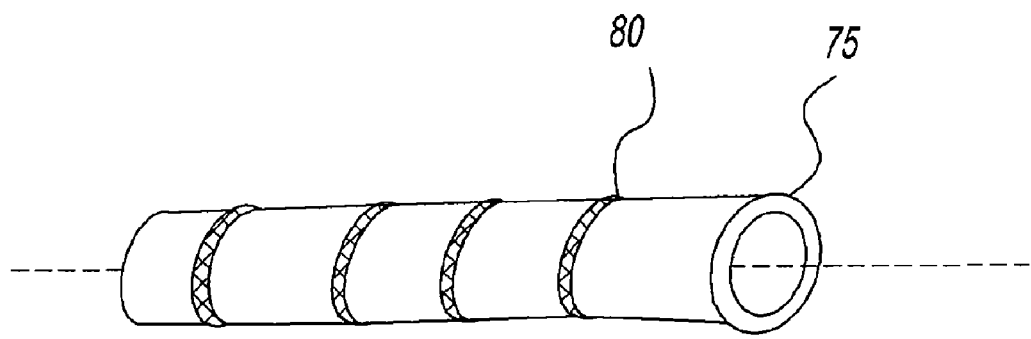
FIG. 5 shows a growth protection system for protecting a tube.
Figure 6:
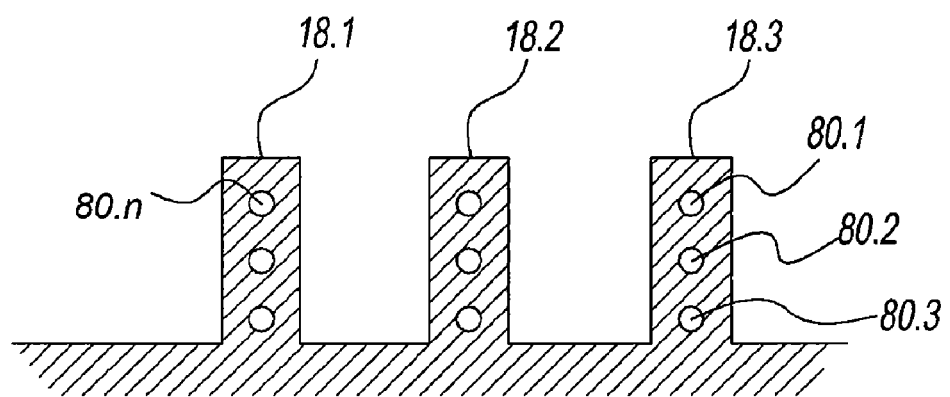
FIG. 6 shows a growth protection system for the protection of cooling fins.
Figure 7:
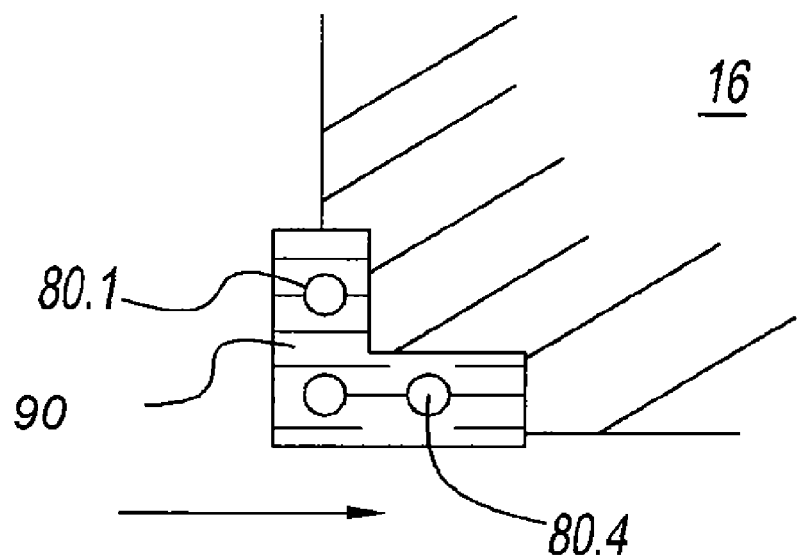
FIG. 7 shows a growth protection system for protecting an inflow opening.
Figure 7:
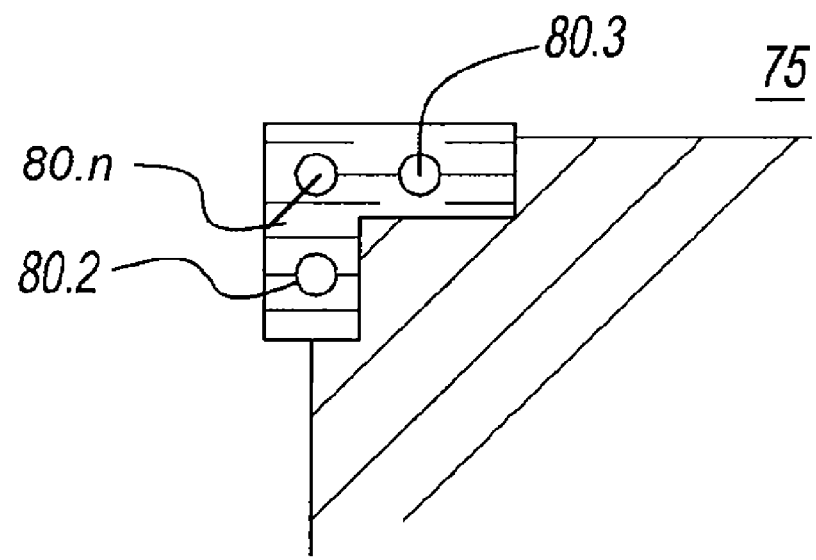

The growth protection system as described above can be used for a large number of technical installations that are located permanently in an ocean water environment and especially for rugged structures or inflow openings of the same. FIGS. 5 to 8 show possible embodiments. FIG. 5 shows a pipe 75 which is enclosed by a heating coil 80 which is heated for a short period of time for destroying any growth originating on the pipe. Accordingly, such heating coils 80.1, . . . , 80.n can be provided in cooling fins 18.1, 18.2, 18.3 which are arranged for example in a passive cooling element on the outside of the housing of a submersible technical installation. Accordingly, a heatable inflow opening 90 can be provided in accordance with FIG. 7 at the inlet of a pipe 75 which leads into the interior of a housing 16. The heating coils 80, 80.1, . . . , 80.n as described above can be arranged as electrically driven resistance heating elements.

Figure 8:
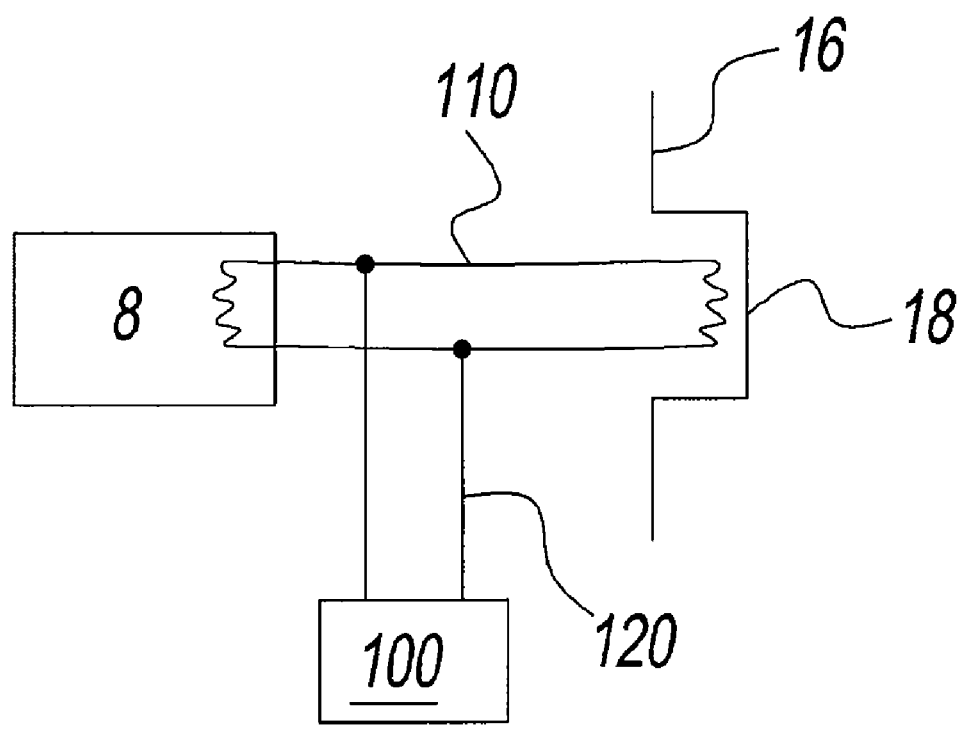
FIG. 8 shows a diagram for a growth protection system, operated by a bypass to a heat source in the cooling circuit.

An alternative embodiment is shown in FIG. 8. A cooling circuit 110 is provided for dissipating heat from an electric generator, which cooling circuit emits heat to a cooling fin 18 on the outside of housing 16. In order to realize the growth protection system, a bypass 120 is used which connects the cooling circuit 110 with a separate heating source 100. The growth protection system will be activated when permitted by the operation of the technical system which produces the waste heat and needs to be cooled, which in the present case is the electric generator 8. This case occurs for submersible power generation systems especially during the standstill of the water turbine and thus when the electric generator 8 is at a standstill. Once the operating mode of heating is activated, the bypass connection 120 from cooling circuit 110 to the separate heating source 100 is opened and the cooling medium which is now guided in the cooling circuit via the separate heat source 100 is heated to such a temperature where any adhering growth is destroyed by excess heat at the target location, which in this case is the cooling fin 18.

Figure 3:
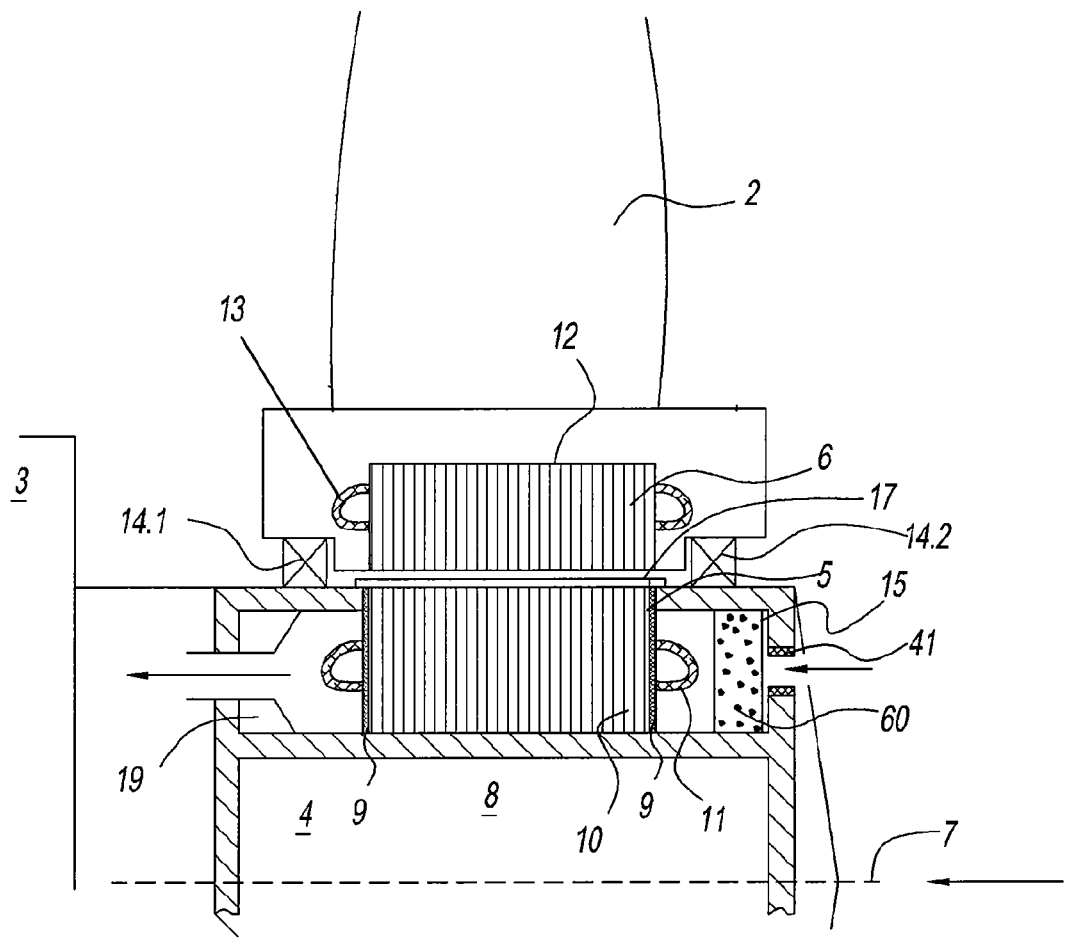
FIG. 3 shows a further embodiment of the invention with a stator region through which ambient water flows.

FIG. 3 shows a further embodiment of a power generation plant in accordance with the invention, in which ambient water flows around the ambient environment of the generator component to be cooled. Accordingly, the corrosion protection element 9 used in accordance with the invention does not enclose any region with a free volume in which the generator components are encapsulated. Instead, the corrosion protection element 9 is moved directly to the respective generator component. This principle shall be explained below by reference to a stator 5 which is arranged in accordance with the invention as an example of an advantageously arranged generator component.

Figure 4:
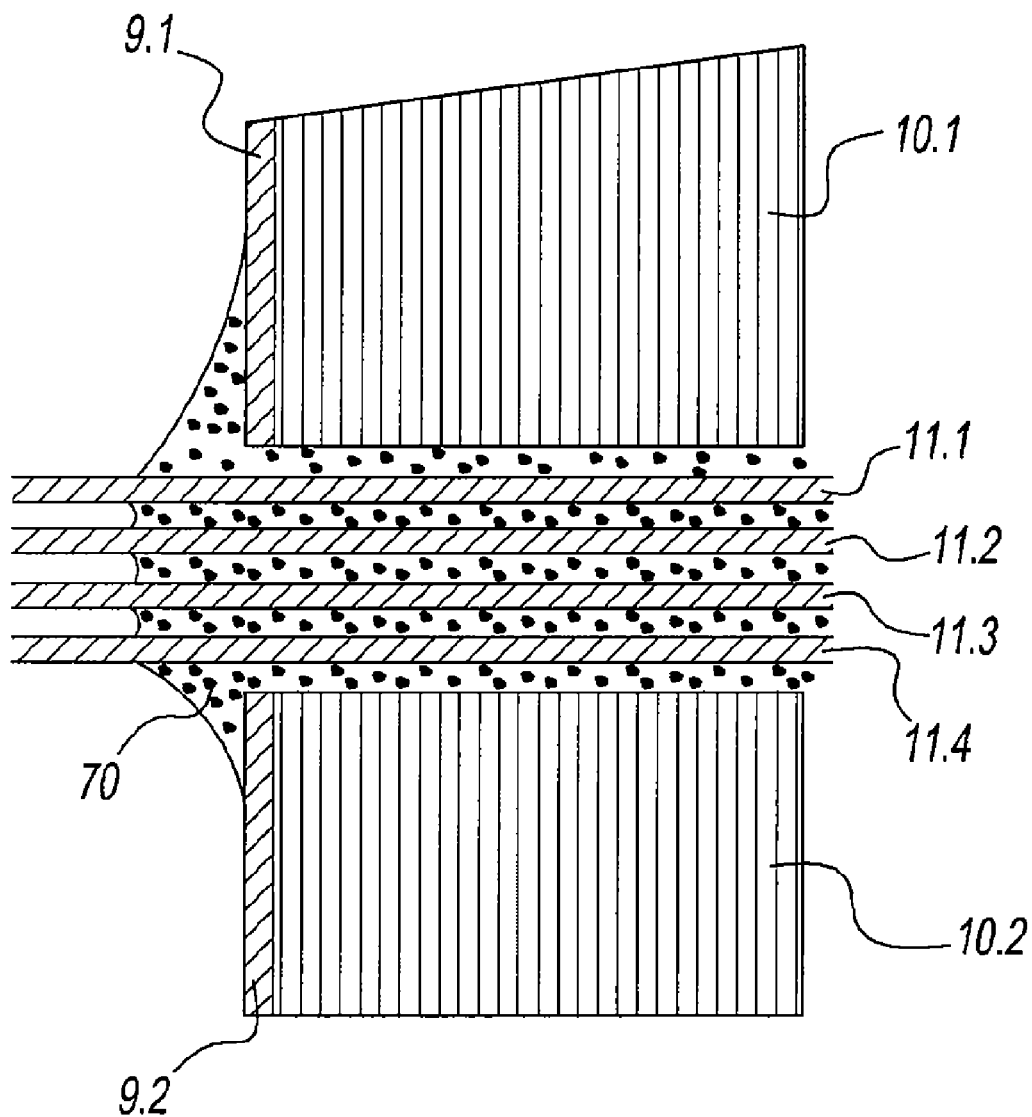
FIG. 4 shows a detailed view of a sectional view through the stator with a cast corrosion protection element.

The stator core 10 and the winding heads of the armature windings 11 are provided with a jacket by a corrosion protection element 9 in the form of an ocean-water-resistant coat of paint or saturation by means of an ocean-water-resistant synthetic resin, especially an epoxy resin. It is further possible to encapsulate the generator core by a directly adjacent external housing which is used as a corrosion protection element 9, with a non-magnetic material, especially austenitic steel, being used. A respective detail of the embodiment is outlined in FIG. 4. The illustrated sections of the stator cores 10.1, 10.2 are enclosed with parts of the corrosion protection element 9.1, 9.2. The breakthroughs and interfaces for the armature windings 11.1, 11.2, 11.3, 11.4 on the stator core 10.1, 10.2 can be sealed by a casting compound 70, e.g. an epoxy resin. The casting compound 70 is part of the corrosion protection element and is in connection with further parts of the same 9.1, 9.2 in such a way that the generator component to be encapsulated, which is in this case the stator cores 10.1, 10.2, are protected against corrosive effects of the ambient water. Accordingly, the armature windings are enclosed with corrosion protection elements 9. For this purpose, the winding may again be provided with an ocean-water-resistant coating or comprise an ocean-water-resistant jacket. Cavities within the corrosion protection elements 9 are filled again by a heat-conductive medium, with casting with epoxy resin being preferable. It is therefore advantageous to thermally also couple the intermediate regions of the armature windings 11 which extend within the stator core 10 by means of a heat-conductive medium, which can again be realized by an ocean-water-resistant casting compound 70 and especially by an epoxy resin.

As is shown in FIG. 3, the ambient water is guided through the constructional region for the stator 5 within the gondola 4 for the second embodiment of the invention for the purpose of efficient cooling of the generator components enclosed by the corrosion protection elements 9. For this purpose, a filter system is provided at the inflow opening for water treatment in order to prevent the infiltration of sediments in particular. A growth protection system 41 can again be provided according to an advantageous embodiment within the gondola 4 in regions where there is contact with the ambient water.

LIST OF REFERENCE NUMERALS

1 Submersible power generation plant
2 Water turbine
3 Support structure
4 Gondola
5 Stator
6 Rotor
7 Rotational axis
8 Electric generator
9, 9.1, 9.2 Corrosion protection element
10, 10.1,
10.2 Stator cores
11 Armature windings
12 Rotor cores
13 Controller windings
14.1, 14.2 Bearings
15 Heat-conductive medium
16 Housing
17 Can
18, 18.1
18.2, 18.3 Cooling fins
19 Encapsulated stator region
20 Encapsulated rotor region
30 Pass-through opening in stator core
40 Pass-through duct
41 Growth protection system
50, 50.2 Heat pipe
60 Filter system
70 Casting compound
75 Pipe
80,
80.1 ... 80.n Heating coil
90 Heatable inflow opening
100 Separate heat source
110 Cooling circuit
120 Bypass

The invention claimed is:

1. A submersible power generation plant, comprising:
a water turbine standing freely on a support structure in an ambient flow;
an electric generator which is driven at least indirectly by the water turbine;
at least one generator component of the electric generator is enclosed by at least one corrosion protection element which seals against ambient water, with a plurality of cavities within the corrosion protection element each being filled with a heat-conductive medium;
at least one pass-through duct being provided for dissipating waste heat from the electric generator, which the pass-through duct conducts the ambient water and leads through the corrosion protection element without entering into any material exchange with a region encapsulated by the corrosion protection element, and
a growth protection system arranged on a flow input of the pass-through duct on an upstream side.

2. A submersible power generation plant according to claim 1, wherein the at least one generator component enclosed by the corrosion protection element is a stator and/or a rotor and/or components of a control and power electronics of the electric generator.

3. A submersible power generation plant according to claim 2, wherein the corrosion protection element encloses a free volume and forms an encapsulated stator region and/or an encapsulated rotor region.

4. A submersible power generation plant according to claim 3, wherein the corrosion protection element comprises a part of a housing and/or an inside wall of a gondola and a can in a gap between the stator and the rotor.

5. A submersible power generation plant according to claim 1, wherein the heat-conductive medium is a fluid medium.

6. A submersible power generation plant according to claim 5, wherein the heat-conductive medium comprises an oil or an ester compound.

7. A submersible power generation plant according to claim 1, wherein the heat-conductive medium is a solid body in granular form or a solid body which was introduced as a casting compound into the plurality of cavities within the corrosion protection element.

8. A submersible power generation plant according to claim 1, wherein the corrosion protection element comprises cooling fins on its outside.

9. A submersible power generation plant according to claim 1, further comprising a heat exchanger apparatus that emits heat from the heat-conductive medium to the ambient water.

10. A submersible power generation plant according to claim 1, wherein the corrosion protection element substantially follows a shape of the at least one generator component enclosed by the corrosion protection element and an installation space of the power generation plant in which the at least one generator component enclosed by the corrosion protection element is placed and flowed through by ambient water.

11. A submersible power generation plant according to claim 10, further comprising a filter system at an inflow opening for supplying the ambient water to an interior of the power generation plant.

12. A submersible power generation plant according to claim 1, wherein the growth protection system comprises a heating device with an associated apparatus for short-time activation of the heating device.

13. A submersible power generation plant according to claim 1, further comprising at least one heat pipe that dissipates thermal energy from an interior of the corrosion protection element.

* * * * *